United States Patent Office 3,684,727
Patented Aug. 15, 1972

3,684,727
DOPED CALCIUM FLUORIDE AND STRONTIUM
FLUORIDE PHOTOCHROMIC COMPOSITIONS
William Phillips, Princeton, N.J., assignor to
RCA Corporation
Filed Jan. 31, 1969, Ser. No. 795,645
Int. Cl. G02b 5/20; F21v 9/02
U.S. Cl. 252—300                                    9 Claims

ABSTRACT OF THE DISCLOSURE

The photochromic properties of $CaF_2$ and $SrF_2$ containing La are enhanced by the addition of Na or K thereto. The photochromic material is prepared by slowly cooling in a temperature gradient, a melt comprising the appropriate ratios of the various metal fluorides in the presence of a seed crystal. The as-grown material is then treated either under gamma irradiation or in a reducing atmosphere.

BACKGROUND OF THE INVENTION

The invention described herein was made in the performance of work under a NASA contract and is subject to the provisions of section 305 of the National Aeronautics and Space Act of 1958, Public Law 85–568 (72 Stat. 435; 42 USC 2457).

This invention relates to improved inorganic photochromic materials and particularly to photochromic calcium fluoride and strontium fluoride.

A photochromic material is one which changes color in a reversible manner when light of a certain frequency or frequencies is incident upon the material. These materials are useful as light valves, in display devices and as memory elements. Both organic and inorganic photochromic materials have been reported. Included in the inorganic class of photochromic materials which have been reported is calcium fluoride doped with lanthanum, cerium, terbium or gadolinium. Strontium fluoride containing these ions is also photochromic, but only at cryogenic temperatures.

An important property of a photochromic material is the amount by which the color can be made to change, or in other terms, the maximum achievable optical density of the material in the wavelength band of the induced color (switched state) as compared to the optical density of that band before inducing a color change in the material (unswitched state). This property determines the maximum achievable contrast ratio of an image on a body of the material and is a function of the number of color centers that are present in the material.

However, the coloration of the photochromic material must be due to switchable or reversible color centers, if the information placed on the material is to be erased after coloration. The maximum number of switchable color centers that one achieve in the aforementioned prior art materials before spurious, non-switching, coloration appears is limited. It would be advantageous for many display or storage applications to increase the number of switchable color centers and thereby increase the attainable contrast ratio in display or image storage devices.

SUMMARY OF THE INVENTION

A photochromic body comprises calcium fluoride or strontium fluoride doped with La together with Na and/or K.

DETAILED DESCRIPTION OF THE PREFERRED EMBODIMENTS

Figure 1:
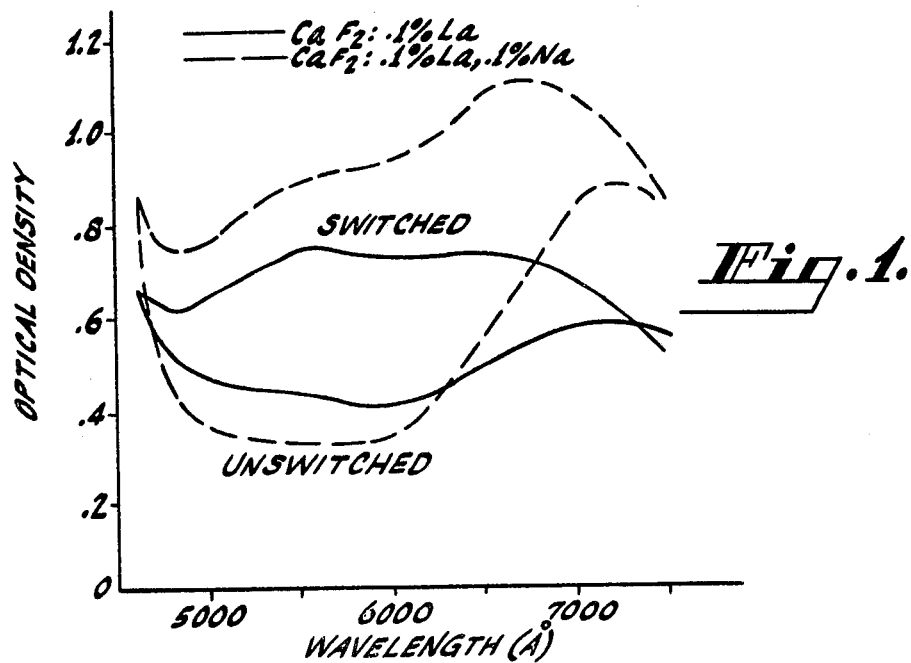
FIG. 1 is a graph showing the optical density of a prior art $CaF_2$:La material and a novel $CaF_2$:La,Na material as a function of wavelength.

It has been found that the contrast ratio attainable in bodies comprising photochromic, rare earth doped alkaline earth such as La doped $CaF_2$ or $SrF_2$, can be significantly increased by the addition of sodium or potassium to the doped crystal. For example, about a 100% increase in contrast ratio due to an increase in switchable color centers can be obtained by further doping $CaF_2$:La with Na.

The novel materials can be prepared by growing the crystals from a melt comprising the alkaline earth fluoride and the appropriate quantities of rare earth metal fluoride and alkali metal fluoride by a gradient freeze technique. This technique is similar to zone refining. The as-grown crystals are then subjected to reducing conditions to maximize the number of photochromic color centers. Applicable reducing conditions include exposing the crystals to gamma irradiation or preferably by annealing the crystals in a calcium vapor atmosphere.

Example 1

Photochromic $CaF_2$:0.08 mole percent La, 0.08 mole percent Na wherein the mole percent of dopant refers to the concentration of dopant in the growth melt, is prepared in the following manner:

A charge consisting 31.2 grams of crushed crystalline high purity $CaF_2$, 0.0627 gram of $LaF_3$, and 0.0134 gram of NaF is placed in a vertical, slightly tapered, cylindrical graphite crucible measuring about ½ inch inside diameter at the bottom and about 4 inches in height. A seed crystal having the desired orientation is present at the bottom of the crucible. A graphite cap is placed on the crucible to retard evaporation of the charge (particularly NaF) when it is heated. The charge is heated in a sealed electrically heated furnace designed in such a way that a temperature gradient exists along the axis of the crucible of about 50° C. per inch. An ambient atmosphere of He and HF gas fills the sealed furnace. The temperature of the crucible is raised to the point where all the charge is melted, but the seed is still solid. It is then lowered at about 7° C. per hour for 16 hours, then to room temperature in an additional eight hours. During the 16 hour growth period the liquid in the crucible freezes progressively from the seed upwards, causing single crystal growth to occur with orientation determined by the seed. The final crystal, about two inches long contains La and Na in solid solution.

The as-grown $CaF_2$:La,Na crystal is clear white and does not exhibit photochromism at room temperature. Room temperature photochromism can be produced in a sample taken from the crystal by sealing it in an evacuated quartz ampoule containing calcium metal. The ampoule is heated in a furnace such that the crystal is at a temperature of about 725° C., the calcium metal is at a temperature of about 710° C., and the crystal and calcium are separated by a "cold" zone at a temperature of about 630° C. This cold zone determines the pressure of the calcium metal vapor in the vicinity of the crystal and thus the extent to which the crystal is reduced.

Similar procedures are followed for the preparation of other photochromic alkaline earth fluorides containing rare earth ions and alkali metal ions therein.

Example 2

Photochromic $CaF_2$:0.08 mole percent La, 0.08 mole percent K is prepared in the same way as the La and Na doped $CaF_2$ of Example 1 except that 0.0186 gram of KF is added to the charge in place of the NaF recited in Example 1.

Example 3

Photochromic $SrF_2$:0.08 mole percent La, 0.08 mole percent Na crystals are prepared from a charge comprising 35.2 grams of pure crystalline $SrF_2$, 0.0439 gram of $LaF_3$ and 0.0094 gram of NaF. The procedure for growing these crystals is the same as that followed in Example 1. The temperature required to melt the $SrF_2$ charge, however, is less than that required to melt the $CaF_2$ charge of Example 1.

Optimum results in terms of contrast ratio and switchable color centers have been achieved when the concentration of the rare earth ion in the $CaF_2$ charge used for preparing the crystal is approximately the same as the concentration of the alkali metal ion therein. This is termed the nominal concentration and differs somewhat from the concentrations of La and alkali metal in the grown crystal due to evaporation and segregation of the $LaF_3$ and NaF during crystal growth. For example, the final concentration of La and Na in a $CaF_2$ crystal grown from a charge containing 0.1 mole percent each of $LaF_3$ and NaF is typically in the order of .04–.08% La and .01–.06% Na depending upon the growth conditions. Preferably the final concentrations of sodium and lanthanum in the crystal are between about 0.01 and 0.1 mole percent.

In the preparation of sodium and lanthanum doped $CaF_2$, it is preferred that the nominal Na and La concentrations be in the range of about 0.06–0.12 mol percent with optimal contrast ratios achievable with nominal equimolar concentrations of Na and La in $CaF_2$ of from about 0.08–0.1 mol percent.

The absorption spectra of prior art photochromic $CaF_2$:0.1 mole percent La in its switched and unswitched states can be compared to the absorption spectra of novel photochromic $CaF_2$:0.1 mole percent La, 0.1 mole percent Na with reference to FIG. 1. The concentrations of dopants referred to in the figures are all nominal concentrations. Light in about the 4,000 A. region switches the crystals, that is, it darkens them by increasing the absorption in the 5,000 A.–7,000 A. range and decreasing the absorption at about 4,000 A. The crystals can be bleached or returned to their unswitched state with intense light in the 5,500 A.–7,000 A. range. Bleaching requires more intense light than writing due to the lower quantum efficiency of the bleaching process. It can be seen that in the switched state the novel photochromic material containing Na has a higher optical density (greater absorption) of light in the region shown in FIG. 1 as compared to the similar prior art material but without sodium. In addition, throughout most of the same spectral region the novel material shown has a somewhat lower optical density in the unswitched state as compared to the prior art material.

Figure 2:
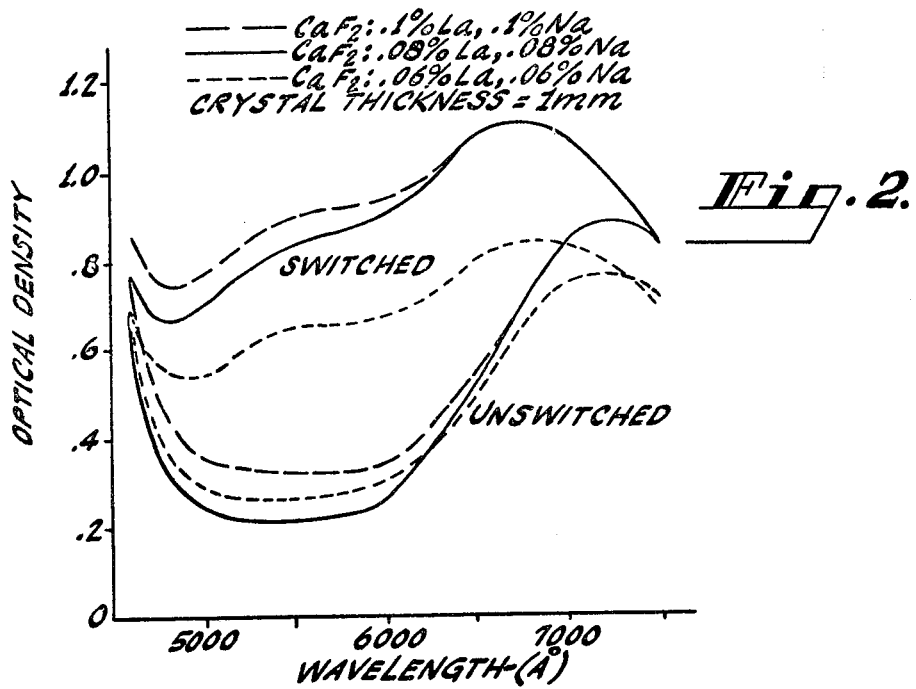
FIG. 2 is a graph showing the effect of doping level on the optical density of novel doped calcium fluoride compositions.

FIG. 2 illustrates by several curves the effect of increasing the nominal dopant concentration in $CaF_2$:La,Na from .06 mole percent to 0.1 mole percent. The contrast ratios, which can be calculated from these curves, indicate that nominal 0.08–0.1 mole percent concentrations of La and Na in $CaF_2$ are superior to the lower concentration of 0.06 mole percent.

I claim:

1. A photochromic composition represented by the formula $MF_2$:$x$La,$y$A wherein M is Ca or Sr,
   A is Na or K,
   $x$ and $y$ represent the mole percent of La and A in the $MF_2$ host,
   $x$ being in the range from 0.01 to 0.1,
   $y$ being in the range from 0.01 to 0.1.

2. A composition of matter as recited in claim 1 comprising calcium fluoride doped with both lanthanum and sodium.

3. A composition of matter as recited in claim 1 comprising calcium fluoride doped with both lanthanum and potassium.

4. A photochromic composition as recited in claim 1 and represented by the formula $CaF_2$:$x$La,$y$Na wherein $x = 0.04-.08$ and
   $y = 0.01-0.06$.

5. A method for preparing photochromic material comprising the steps of
   (a) melting in the presence of a seed crystal, a mixture comprising, an alkaline earth fluoride selected from calcium fluoride and strontium fluoride, lanthanum fluoride, and an alkali metal fluoride selected from sodium fluoride and potassium fluoride;
   (b) slowly reducing the temperature in a manner so as to grow a single crystal from said melt, the orientation of which is determined by the seed crystal; and
   (c) subjecting said single crystal to reducing conditions so as to develop photochromic color centers therein.

6. The method described in claim 5 wherein the mixture comprises from 0.06–0.12 mole percent lanthanum fluoride, and 0.06–0.12 mole percent alkali metal fluoride.

7. The method recited in claim 5 wherein the mixture comprises calcium fluoride with from 0.06–0.12 mole percent lanthanum fluoride and 0.06–0.12 mole percent sodium fluoride.

8. The method of claim 7 wherein the lanthanum and sodium fluorides are present in the mixture in equimolar proportions of from 0.08–0.12.

9. The method of claim 8 wherein the grown single crystal is subjected to a reducing atmosphere of calcium vapor.

References Cited

Staebler et al.: Applied Physical Letters, vol. 14, No. 3, Feb. 1, 1969, pp. 93–4.

GEORGE F. LESMES, Primary Examiner

J. P. BRAMMER, Assistant Examiner

U.S. Cl. X.R.

23—301; 350—160 P